United States Patent
Saugnac et al.

(10) Patent No.: US 6,267,838 B1
(45) Date of Patent: Jul. 31, 2001

(54) SANDWICH PANEL MADE OF A COMPOSITE MATERIAL AND PRODUCTION METHOD

(75) Inventors: Frédéric Saugnac, Auzeville-Tolosane; Bruno Pelouze, Castelginest, both of (FR)

(73) Assignee: Aerospatiale Societe Nationale Industrielle, Paris Cedex (FR)

( * ) Notice: Subject to any disclaimer, the term of this patent is extended or adjusted under 35 U.S.C. 154(b) by 0 days.

(21) Appl. No.: 09/477,406

(22) Filed: Jan. 4, 2000

Related U.S. Application Data

(62) Division of application No. 08/662,765, filed on Jun. 10, 1996, now abandoned.

(30) Foreign Application Priority Data

Jun. 9, 1995 (FR) .................................................. 95 07101

(51) Int. Cl.[7] ................. B65C 9/25; E04B 1/82
(52) U.S. Cl. ............................. 156/320; 181/292
(58) Field of Search ................... 181/284, 286, 181/290, 292, 293, 294, 296; 428/116; 156/242, 290, 291, 320

(56) References Cited

U.S. PATENT DOCUMENTS

| | | |
|---|---|---|
| 2,363,068 | 11/1944 | Leadbetter . |
| 2,952,579 | 9/1960 | Merriman . |
| 3,166,149 | 1/1965 | Hulse et al. . |
| 3,439,774 | 4/1969 | Callaway et al. . |
| 3,481,427 | 12/1969 | Dobbs et al. . |
| 3,822,762 | 7/1974 | Crispin et al. . |
| 4,300,978 | 11/1981 | Whitemore et al. . |
| 4,379,191 | 4/1983 | Beggs et al. . |
| 4,384,020 | 5/1983 | Beggs et al. . |
| 4,465,725 | 8/1984 | Riel . |
| 4,504,346 | 3/1985 | Newsam . |
| 4,671,841 | 6/1987 | Stephens . |
| 4,824,711 | 4/1989 | Cagliostro et al. . |
| 4,842,398 | 6/1989 | Ducassou . |
| 4,879,152 | 11/1989 | Green . |
| 4,973,506 | 11/1990 | Bauer et al. . |
| 4,990,391 | 2/1991 | Veta et al. . |
| 5,037,498 | 8/1991 | Umeda . |
| 5,543,198 | 8/1996 | Wilson . |

FOREIGN PATENT DOCUMENTS

| | | |
|---|---|---|
| 633 604 | 12/1982 | (CH) . |
| 39 13 255 | 10/1990 | (DE) . |
| 0 201 104 | 11/1986 | (EP) . |
| 0 314 625 | 5/1989 | (EP) . |
| 0 477 505 | 4/1992 | (EP) . |
| 0 543 752 | 5/1993 | (EP) . |
| 2 525 963 | 11/1983 | (FR) . |
| 2609179 | 7/1988 | (FR) . |
| 2 630 831 | 11/1989 | (FR) . |
| 2 710 874 | 4/1995 | (FR) . |
| 2 056 367 | 3/1981 | (GB) . |
| 2-080380 | 3/1990 | (JP) . |
| WO 84/04727 | 12/1984 | (WO) . |
| WO 88/07688 | 10/1988 | (WO) . |
| WO 92/12854 | 8/1992 | (WO) . |

*Primary Examiner*—Khanh Dang
(74) *Attorney, Agent, or Firm*—Young & Thompson

(57) ABSTRACT

A sandwich panel made of a composite material with acoustical attenuation for a wall and/or self-supporting covering, more particularly for doubling the bulkheads or cabin walls of aircraft, and including an alveolar structural core (14) especially a honeycomb core, and two skins (12, 16) disposed and rendered integral on both sides of the core, wherein the two skins (12, 16) include holes and wherein the holes of at least one of the two skins are micropores. A method for producing this panel is also disclosed.

22 Claims, 3 Drawing Sheets

SANDWICH PANEL MADE OF A COMPOSITE MATERIAL AND PRODUCTION METHOD

CROSS-REFERENCE TO RELATED APPLICATIONS

This application is a division of application Ser. No. 08/662,765, filed Jun. 10, 1996, now abandoned.

FIELD OF THE INVENTION

The present invention concerns a sandwich panel made of a composite material with acoustic attenuation for a self-supporting and/or wall covering, as well as the method for producing said panel and more particularly one of the skins of the sandwich panel.

BACKGROUND OF THE INVENTION

In the particular case of an aircraft fuselage, a search is under way to reduce noise to improve passenger comfort and that of the air crew who are frequently for long periods subjected to an ambience at a high acoustic level caused by the engine, vibrations and air flows.

The frequencies are more particularly generated within ranges exceeding 500 Hz and more particularly between 1200 and 2000 Hz and these frequencies need to be treated as a priority as the organism of passengers is extremely sensitive to these.

The acoustic problems posed by aircraft fuselages also need to be resolved by suitably-adapted panels, but by taking account of complementary constraints, such as the weight, thickness, prices but also aesthetic constraints as these panels need to be able to be decorated on the internal face on the cabin side.

In a fuselage, there is one possible solution which consists of embodying an internal cock with heavy materials so as to limit transmission of noise, but this possibility is not readily compatible with the required lightness criteria.

Moreover, so as to obtain optimal efficiency, the cock needs to be sealed to avoid leaks, otherwise the acoustic treatment instead of reducing the intensity of the noise in the cabin tends amplify.

It is possible to measure the total noise volume, but this volume is not strictly harmful. On the other hand, the SIL (Speech Interference Level), which corresponds to a level of noise within a range of given frequencies for speech, is a highly important factor. It is necessary to reduce it and also important to reduce the level of noise in the SIL frequencies. In fact, the level of noise in certain frequencies may result in speech not being intelligible.

Another solution consists of disposing on the passage an absorbent material, such as an open-celled foam so as to reduce the acoustic level originating from the power unit. It is known that the noise propagates indirectly and is distributed in the cabin so it is also necessary to also treat this indirect noise and in particular that it is not amplified or reverberates onto the walls.

At the current moment in aircraft, these panels are provided with a high acoustic absorption coefficient and include at least one layer of foam so as to avoid the direct transmission of the source towards the inside of the cabin.

There are also decorative and aesthetic constraints as the face oriented towards the inside of the cabin needs to be covered so as to provide comfort and must possess a certain aesthetic aspect.

This interval face of the panel when seen and in physical contact with passengers need to be able to be cleaned easily when maintaining the inside of the cabin. Moreover, it is essential that the panel is sufficiently rigid so that a person can lean on it, even in cases of impact, without breaking it, this rigidity requiring that said panel possesses good mechanical resistance.

The solution retained by the invention consists of embodying covering panels with high acoustic attenuation, the aim of said panels being to dampen noise in the cabin and generated by the various links or acoustic bridges, it being known that an isolated leak-free cock cannot be easily embodied in a practical way for an aircraft cabin. It Is therefore necessary to have a panel able to resist reverberations, especially when the cabin is small, and a panel which is light and simple to produce so that the cost price remains within limits lower than those of existing panels.

Fire-resistance is another restraint to be observed for materials forming part of the walls of aircraft cabins. Therefore, it is essential that the components used when producing said wall observe the current standard FAR 25 § 853 (Fire/Fumes/Toxicity criteria) applicable to commercial aircraft.

In the various applications, documents exist of the prior art which concern rigid panels made of a composite material aimed at attenuating noises.

The patent FR-A-2.710.874 in the name of the Applicant concerns a rigid sheet self-supporting material for acoustic attenuation and a panel made of this material.

This material includes:

an a alveolar structural core, the alveolar being open, more particularly a honeycomb, an acoustically absorbent material filling the alveoles, strips of resistant fibres forming openings on each of the faces, and a wide mesh trellis covering the unit.

This type of panel is used as a transverse separation wall, especially in aircraft cabins. This panel is able to fully dampen the noise in the cabin, especially for turbopropeller engine type aircraft, but this panel is too heavy, too thick and especially less effective as a bulkhead covering, said bulkhead already generally including other acoustically absorbent materials.

The patent U.S. Pat. No. 3,439,774 describes a panel forming a housing for an aircraft reactor and intended to absorb the noise generated by the functioning of this reactor. To this effect, the following is superimposed from outside to inside a full sheet forming a casing, first spider type alveolar structural core, a first sheet made or a micro perforated metallic material with holes of between 50 and 500 $\mu$m, a second spider type alveolar structural core, and a second sheet made of a micro perforated metallic material with upper permeability.

Thus, the high frequency noises propagate from inside to outside are preferably absorbed by the second sheet and the low frequencies are absorbed by the second sheet after treatment via passage through the second sheet.

This material is too thick to be used as a covering on a cabin wail. The material is thus revealed as being too heavy and this panel is limited to the particular application envisaged, namely the reduction of propagation of the noise originating from the aircraft engine.

Finally, the patent application DE-A-3.91 3.255 describes a panel including a plate including holes, a non-woven sheet, a honeycomb core, a plate fitted with holes with a smaller diameter and a thick mineral wool covering.

This panel includes an acoustic damper but it is too thick, too heavy and too complex to be applied to aircraft cabin internal covering panels.

The present invention also concerns a covering and/or self-supporting panel with acoustic damping, which is light, mechanically resistant and sufficiently simple to produce so that its cost price is compatible with the application to the aircraft cabins and whose fire-resistance satisfies current standards and whose internal face on the cabin side can be decorated.

The present invention also includes a method for producing said sandwich panel and more specifically method for producing one of the skins of the sandwich.

SUMMARY OF THE INVENTION

To this effect, the sandwich panel of the invention, made of a composite material with acoustic attenuation for a wall and/or self-supporting covering, more particularly of doubling the bulkheads or walls of aircraft cabins and including a open alveolar structural honeycomb core and two skins disposed and rendered integral on both sides of said core, is characterised in that the two skins include holes and in that the holes of at least one of the two skins are micropores.

According to another characteristic, the micropores result from a non-mechanical physicochemical action, the average diameter of the micropores having a hole passage section of several hundred of one $mm^2$.

According to one embodiment, the first skin includes micropores and the second skin is a wide mesh material.

Furthermore, the microporous skins include a single ply of a woven material coated with a resin.

For the embodiment of the sandwich panel of the invention, the resin is a resin whose polymerisation is a polycondensation reaction, such as a phenolic resin.

The invention also provides the possibly by which the skin intended to be orientated on the internal side of the cabin includes a layer of a decoration material, in particular a fabric transparent to sounds.

In the case where the face orientated towards the inside of the cabin is a microporous skin, the decorative material may be a paint.

The invention also concerns a method for producing said sandwich panel. The method makes it possible to embody the panel in a single operation by generating the holes simultaneously on linking of the skins with the alveolar core.

BRIEF DESCRIPTION OF THE DRAWINGS

The present invention is hereafter described according to a particular non-restrictive embodiment given by way of example, said description being given with reference to the various accompanying drawings on which

DETAILED DESCRIPTION OF THE PREFERRED EMBODIMENTS

Figure 1:
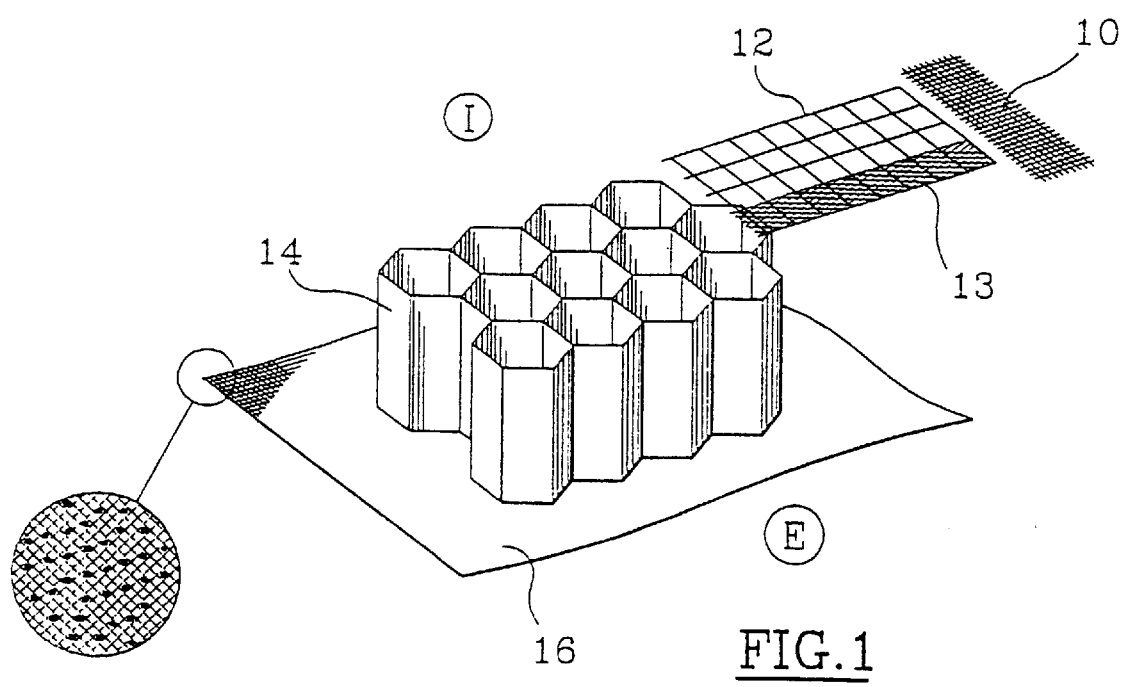
FIG. 1 represents a perspective view of an embodiment of a covering panel with an acoustic damper.

According to the embodiment of FIG. 1, the panel shown includes from the inside I to the outside E a decoration layer 10, a first skin 12 with wide meshes, an open alveolar structural core 14 and a second skin 16 with microdores.

The resins of the various skins are of the phenolic type as they offer a large number of advantages:

extremely good fire-resistance, extremely low calorific flowrate, and low transmission of toxic products in cases of inflamation.

The decoration layer 10 includes a decoration fabric interfering a little as possible with the acoustic damping properties but its role is to mask from view the first wide mesh skin 12 without modifying the spectrum of the frequencies of sounds which propagate inside the cabin.

The fabric of this layer 10 has been treated to be dirt-repellent so that it soils as slowly as possible and can be easily cleaned on site.

The first wide mesh skin 12 helps in mechanically reinforcing the panel. The skin is obtained from a glass fabric impregnated with phenolic resin. The characteristics of the glass fabric are as follows:

Surface mass: 278 $g/m^2$;

Thickness: 0.4 mm;

square mesh of about 1.8 mm between the thread axes.

This first skin 12 is possibly completed by reinforcements 13, also embodied from a glass fabric impregnated with phenolic resin, and disposed at suitable locations determined by material resistance calculations made those skilled in the art.

The core 14 may be a honeycomb core made of aramid fibre paper, such as the paper commercially known as <<NCMEX>>®.

The second skin 16 is the main element of the combination, as shall be explained subsequently. This skin is cbtained from a glass fibre coated with phenolic resin whose characteristics are the following:

Surface mass: 107 $g/m^2$

Thickness: 9/100 mm

Reinforcement: Satin of 4

Number of cabin threads to one cm: 24

Number of weft threads to one cm: 23

As for impregnation; this is effected with a nominal mass percentage of 40% resin.

Phenolic resins polymerise via a polycondensation reaction which is accompanied by a freeing of water in the form of a vapour at temperatures exceeding 100° C., the baking temperature generally being 150° C.

Thus, during the baking cycle for polymerisng the resin, the water vapour and the volatile solvents escape.

A first hypothesis can be put forward concerning the and leaving empty spaces to exist between the meshes. Generally speaking, producers are seeking to eliminate these micropores, especially via the disposition of the fabric and seeking to obtain sealing against a mould or more exactly against the face of the shaping tool if the panel to be obtained is not flat or by introducing degassing phases.

A second hypotheses can also be put forward by which during polymerisation the polymer passes firstly through a sufficiently liquid phase with a simultaneous contration between two staple slivers which tends to make a hole appear on of the thin layer. As the fabric has meshes, the hole tends to appear at the centre of the mesh. Polymerisation then locks the plymer in this situation which generates the sought-after micropores.

Figure 6:
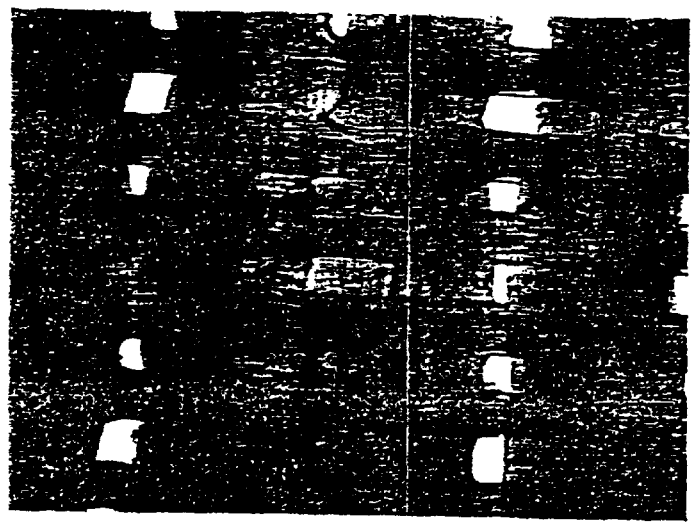
FIG. 6 represents a microscopic view of a microporous skin according to the invention.

FIG. 6 shows a view from a microscope, magnification of about 60, of the microporous skin obtained.

Figure 5:
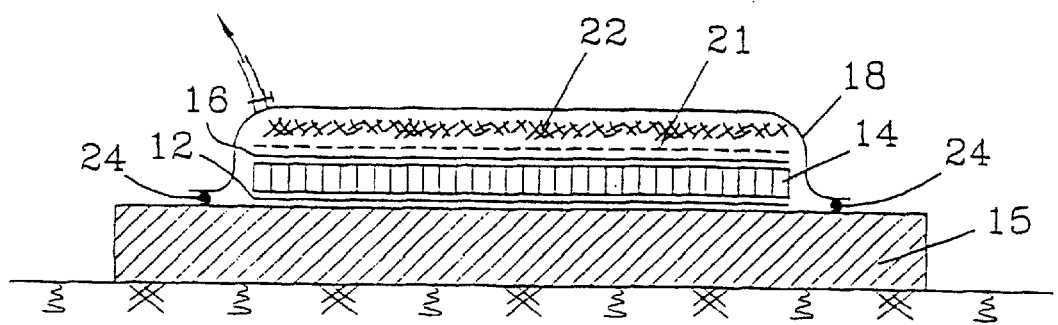
FIG. 5 represents a cutaway view showing a stage of the method of the invention.

Contrary to the techn aues of the prior art which sought to suppress the micropores and overcoming the resultant presumption, the method of the invention includes the succession of the following stages and with reference to FIG. 5:

Draping of the first wide mesh glass fabric skin 12 and any possible reinforcements 13 on a metallic tool 15 to the shape of the panel to be obtained (flat to simplify the drawing) coated with a mould-removal agent, Placing of the honeycomb core 14 on this skin, Placing on the honeycomb core the second fine mesh glass fibre skin 16, Placing environmental products including known types of the required consumable elements, especially a layer 21 of and anti-adherent perforted material made, For example, of fluorethylene, a layer 22 of a draining material, such cotton wool, which, apart from allowing a good distribution of the partial vacuum, enables the resin surplus to be absorbed, Placing of a flexible bladder 18, generally made of nylon, surrounding the entire sandwich and the consumable substances, the sealing of the bladder 18 with the mould 15 being obtained by mastic type cords 24 made of a suitable material, Creating a vacuum inside the bladder 18, generally made of level between $5.10^4$ and $9.10^4$ Pa, Baking cycle:
Introducing the bladder 18 and the sandwich unit in the oven, Baking cycle:
Raising to the polymerisation temperatures,
Maintaining this polymerisation temperature up to the desired cross-linking degree,
Stopping heating and free cooling, Breaking of the vacuum and return to atmospheric pressure when the temperature is preferably less than $T_G$ (vitreous transition temperature), and Removing the element from the mould.

During this polymerisation, micropores have formed whose geometry, number and size depend on the polymerisation conditions. These parameters can be controlled and be reproduced.

In the following baking conditions:
raising to a temperature at a rate of 5° C. per minute,
mantaining a temperature of 150° C. for a period 1 hr 30 mins;
breaking of the vacuum when the temperature is less than 40° C., micropores are obtained whose geometry is approximately rectangular, the sides having dimensions of between 0.1 and 0.3 mm (cf. FIG. 6).

It is to noted that the important parameters to control are:
maximum temperature to be reached for polymerisation,
vacuum level,
mould-removal temperature,
resin mass percentage,
properties of the resin,
choice of reinforement.

As for the docoration layer 10, this is then glued on the first skin 12 with a suitable adhesive, such as pulverised vinyl glue (4301-8 of the <<Joint Francais>>) is as to avoid disturbing fire resistance and acoustic transparence. It is possible to use the fabric commercially available under the name AERIA T1 from the TEXAA company.

It is preferable to coat this first skin 12 with a paint prior to glueing of the decoration fabric so that the bottom does not appear through the meshes of this decoration fabric.

Figure 2:
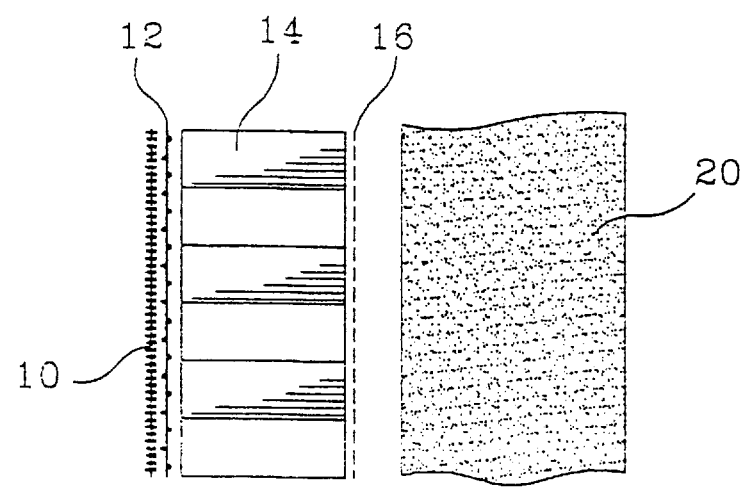
FIG. 2 represents a transverse cutaway view of a panel, as shown on FIG. 2 and placed in an aircraft cabin.

FIG. 2 shows a cutaway view of a covering panel obtained and disposed immediately close to an aircraft cabin bulkhead incluing a layer 20 of a damping material, such as an open cell foam. This foam has a damping effect on direct noises propagatying from external sources towards the inside through said bulkhead, but also absorbs noises propagating in the cabin and treated by the panel.

In fact, the noises propagating in the cabin pass through the decoration layer 10, through the fist wide mesh skin 12 and then through the micropores of the seconds skin 16 so as to be dampened by the open cell foam layer 20. This foam is independent of the panel and could be secured by suitable slugs to said panel.

This panel is thin, offers good mechanical resistance due to its sandwich structure and possesses a certain aptitude for receiving a decoration fabric. The panel is also embodied in a single stage which makes it possible to simultaneously ensure securing of the tow skins to the honeycomb core and the embodiment of the micropores without required any other intervention.

Figure 3:
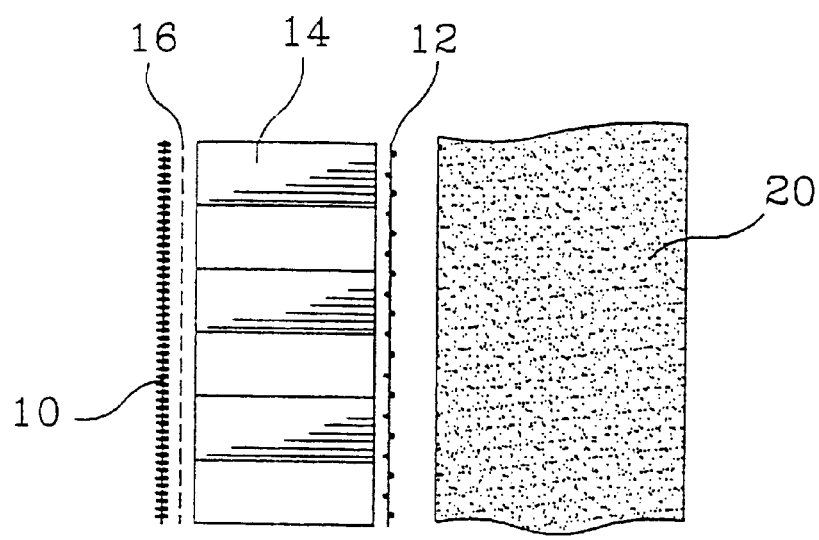
FIG. 3 represents a first variant of FIG. 1.

FIG. 3 shows a first variant in the dispostion of the panel of the invention. If fact, in this case, the mounting of the panel is effected by disposing the second microporous skin panel is effected by disposing the ssecond cabin. The acoustic dampening qualities are therefore modified as the surface of the panel on the cabin side exhibits a large reverberation surface, which tends to generate a certain amount of reverberation. On the other hand, this second microporous skin 16 can directly receive a paint by means of projection and adapted to retain the micropores.

The covering could be preferably be speckled as the paint layer needs to remain thin and the adherence of the paint remains limited in the small bending radius portions.

Of course, the second microoorous skin 16 can, as in the main emodiment, receive a decoration fabric transparent to sound.

Figure 4:
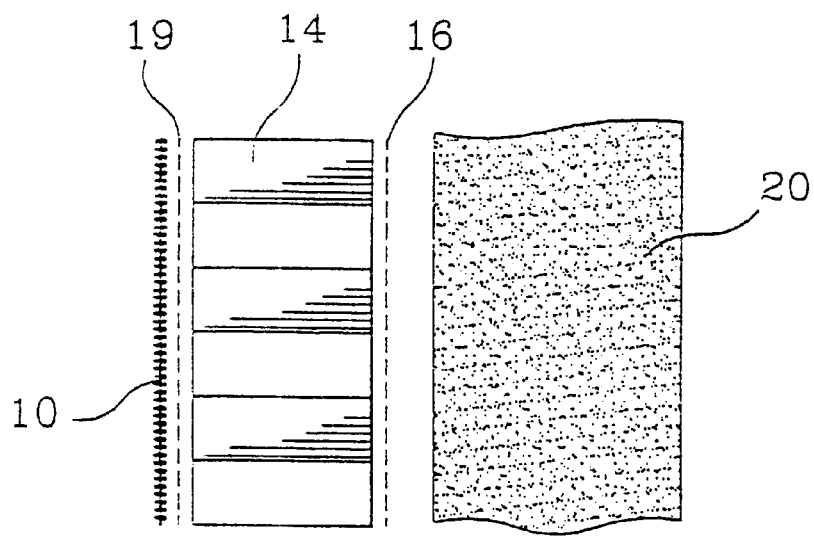
FIG. 4 represents a second variant of FIG. 1.

On FIG. 4, the ebodied panel includes a central core with a skin on both sides, but the first wide mesh skin 12 has been replaced by a microporous skin 16. The panel obtained is composed of a central core with a microporous skin on both sides of this central core.

The embodiment method is adapted by modiying the resin mass percentage so as to obtain a microporosity on each of the two skins.

This panel can directly receive a paint, and in the first variant of FIG. 3.

The variant of FIG. 4 possesses mechanical resistance qualities better than those of the panels of of FIGS. 2 and 3 with a substantial advantage of a mass gain.

The recourse to the panels as shown on FIG. 4 shall be dictated by requirements.

As regards the various embodiments, it can be seen that the micropores are generated in particular by the polycondensation reaction and the area contraction phenomena of the resin with the result that the panel can be obtained directly in a single operation. The assembling of the skins with the alveolar structural core, an operation required in all cases for embodying a sandwich structure, is turned to good account so as to simultaneously generate the micropores without any restart procedure, mechanical machining and intermediate blowing.

This method is able to embody easily in a single operation a sandwich panel which is of simple design, is light, mechanically resistant and satisfies standards concerning fire, fumes and toxicity and the materials used are well-known, less numerous and have already demonstrated their reliable propertties in instances of fire.

What is claimed is:

1. A method making an acoustic insulation panel comprising the steps of:

providing a form having a shape of a desired said panel;

placing a first skin comprising resin on ther form;

placing a honeycomb core in direct contact with the first skin;

placing a second skin comprising resin in direct contact with the honeycomb core; and heating the first skin, second skin, and honeycomb core;

wherein the heating step produces perforations in the first and second skins and wherein the perforations of at least one of the first and second skins are micropores.

2. The method of claim 1, wherein the resin is one whose polymerization is a polycondensation reaction.

3. The method of claim 2, wherein the resin is a phenolic resin.

4. The method of claim 3, wherein the resin exhibits an area contraction prior to cross-linking.

5. The method of claim 4, wherein the heating step is performed on an assembly including no skins other than the first and second skins.

6. The method of claim 5, wherein the heating step is performed on an assembly including no core material other than the honeycomb core.

7. The method of claim 6, wherein pressure is reduced to less than atmospheric pressure during the heating step.

8. The method of claim 7, wherein the heating step is performed to achieve micropores which are approximately rectangular.

9. The method of claim 8, wherein the micropores measure between 0.1 and 0.3 mm along each side.

10. The method of claim 9, wherein the first skin, second skin, and honeycomb core are not returned to atmospheric pressure until first skin, second skin, and honeycomb core have cooled to a temperature of less than a vitreous transition temperature.

11. The method of claim 10, wherein the vitreous transition temperature is 40° C.

12. The method of claim 4, further comprising the step of placing environmental products on the second skin prior to the heating step.

13. The method of claim 12, wherein the environmental products comprise consumable elements.

14. The method of claim 12, further comprising the step of placing a flexible bladder around the first and second skins, honeycomb core, and environmental products, the flexible bladder remaining around the first and second skins, honeycomb core, and environmental products during the heating step.

15. The method of claim 14, wherein during the heating step, the pressure within the bladder is lower than atmospheric pressure.

16. The method of claim 15, wherein after the heating step the first skin, second skin, and honeycomb core are cooled and returned to atmospheric pressure.

17. The method of claim 16, wherein the first skin, second skin, and honeycomb core are not returned to atmospheric pressure until first skin, second skin, and honeycomb core have cooled to a temperature of less than a vitreous transition temperature.

18. The method of claim 17, wherein the vitreous transition temperature is 40° C.

19. The method of claim 17, wherein the heating step is performed to achieve micropores which are approximately rectangular.

20. The method of claim 19, wherein the micropores measure between 0.1 and 0.3 mm along each side.

21. The method of claim 19, wherein the heating step continues for 1 hour 30 minutes.

22. The method of claim 21, wherein during the heating step a temperature of 150° C. is achieved.

* * * * *

UNITED STATES PATENT AND TRADEMARK OFFICE
CERTIFICATE OF CORRECTION

PATENT NO. : 6,267,838 B1
DATED : July 31, 2001
INVENTOR(S) : Frederic Saugnac and Bruno Pelouze It is certified that error appears in the above-identified patent and that said Letters Patent is hereby corrected as shown below:

Column 4,
Line 55, between "the" and "and" the following phrase is lacking -- formation of micropores by which the bases escape from them --
Line 64, replace "contration" by -- contraction --

Column 6,
Line 12, replace "propagatying" by -- propagating --
Line 15, replace "fist" by -- first --
Line 16, replace "seconds" by -- second --
Line 30, replace "ssecond cabin" by -- second microporous skin 16 oriented towards the inside of the cabin --
Line 40, replace "microoorous" by -- microporous --
Line 54, delete second occurrence of "of".

Signed and Sealed this

Fourteenth Day of May, 2002

*Attest:*

*Attesting Officer*

JAMES E. ROGAN
*Director of the United States Patent and Trademark Office*